United States Patent [19]

Wikstrom

[11] Patent Number: 4,619,583
[45] Date of Patent: Oct. 28, 1986

[54] WIND TURBINE

[76] Inventor: Bengt R. Wikstrom, Elinebergs Plats 8, S-252 58, Helsingborg, Sweden

[21] Appl. No.: 578,799

[22] Filed: Feb. 10, 1984

[30] Foreign Application Priority Data

Dec. 9, 1983 [SE] Sweden ................................ 8306803

[51] Int. Cl.⁴ .............................................. F03D 3/02
[52] U.S. Cl. .................... 416/122; 416/117; 416/146 A
[58] Field of Search ............... 416/117, 122 A, 122 R, 416/123, 128, 170 A, 120, 121 A, 146 A, 112 A, 110, 111, 121 R, 99

[56] References Cited

U.S. PATENT DOCUMENTS

| | | | |
|---|---|---|---|
| 203,884 | 5/1878 | Brayman | 416/123 |
| 653,047 | 7/1900 | Werner | 416/122 A |
| 869,709 | 10/1907 | Homola | 416/122 A |
| 965,108 | 7/1910 | Hesse | 416/146 A |
| 1,256,338 | 2/1918 | Liles | 416/99 |
| 1,809,919 | 6/1931 | Turner | 416/17 X |
| 2,197,293 | 4/1940 | Bremner | 416/113 |
| 3,067,824 | 12/1962 | Sullivan | 416/99 X |
| 4,161,370 | 7/1979 | Oppolzer | 416/122 A X |
| 4,446,379 | 5/1984 | Borg et al. | 416/117 X |
| 4,509,899 | 4/1985 | Frederick | 416/99 |

FOREIGN PATENT DOCUMENTS

| | | | |
|---|---|---|---|
| 22964 | 4/1918 | Denmark | 416/122 A |
| 66540 | 3/1948 | Denmark | 416/122 A |
| 915440 | 7/1954 | Fed. Rep. of Germany | 416/121 A |
| 1021252 | 2/1953 | France | 416/41 R |
| 39680 | 3/1957 | Poland | 416/99 |
| 7900818 | 7/1983 | Sweden | 416/110 |
| 428825 | 7/1983 | Sweden | |

Primary Examiner—Everette A. Powell, Jr.
Attorney, Agent, or Firm—Cushman, Darby & Cushman

[57] ABSTRACT

A wind turbine with two rotors equipped with wings, which are mounted on horizontal shafts rotatably mounted in a bearing unit. The rotors are displaced 180° in relation to each other. The bearing unit is connected to a rotatably mounted vertical output shaft with the rotor shaft projecting substantially radially on diametrically opposite sides of the output shaft, gear wheels of the rotor shafts engaging a gear ring mounted coaxially with the output shaft stationarily in relation to the output shaft. A second pair of rotors of the same type as the first pair are mounted on shafts which are rotatably mounted in the bearing unit perpendicularly to the shafts of the first pair of rotors and are displaced 180° in relation to one another and 90° in relation to the first pair of rotors. A gear train interconnects the rotors for position-synchronized rotation.

4 Claims, 5 Drawing Figures

WIND TURBINE

The invention concerns a wind turbine with a first pair of rotors equipped with wings, each with the plane of one wing arranged substantially axially and with the plane of the other wing arranged substantially perpendicularly to said axial plane, the positions of said rotors being shifted 180° in relation to each other, said rotors being mounted to shafts which are rotatably mounted in a bearing unit, which is connected with a vertical output shaft rotatably mounted with the rotor shafts projecting substantially radially on diametrically opposite sides of the output shaft, gear wheels on the rotor shafts engaging a gear ring arranged coaxially with the output shaft, which is stationary in relation to the output shaft, for rotating the bearing unit and thus the output shaft through the rotation of the rotors.

This type of turbine is described in detail in the Swedish patent application No. 7900818-1, to which reference is made concerning detailed information on the design and function of the turbine. Besides the fact that the wind turbine enables placing of the machine which is driven by the turbine, on ground level, the wind turbine is advantageous because the wing-equipped rotors make little air-resistance when rotating and, thus, work quite noiseless as the rotors do not cause any whining when rotating. The wind turbine can transfer relatively large quantities of energy at high efficiency and, furthermore, can operate also at low wind speeds.

In order to increase the power which can be taken from a wind turbine of the type referred to above, to substantially the double, the wind turbine of the invention is characterised in that a second pair of rotors of the same type as said first pair is arranged on horizontal shafts which are rotatably mounted in the bearing unit perpendicularly to the shafts of said first pair, the positions of said second pair of rotors being shifted 180° in relation to each other and 90° in relation to said first pair of rotors, and further characterised in that the first and second pairs of rotors by means of a gear drive are interconnected for position-synchronized rotation.

By this arrangement it is achieved that the four rotors can be interconnected for position-synchronized rotation over a compact gear drive which requires little space and can easily be positioned in a gear housing.

For a more detailed explanation of the invention, an embodiment of such a wind turbine will be described further below with reference to the accompanying drawings, in which FIG. 1 is a side view of a wind turbine according to the invention, placed at the top of a mast which is shown fragmentarily;

Figure 1:
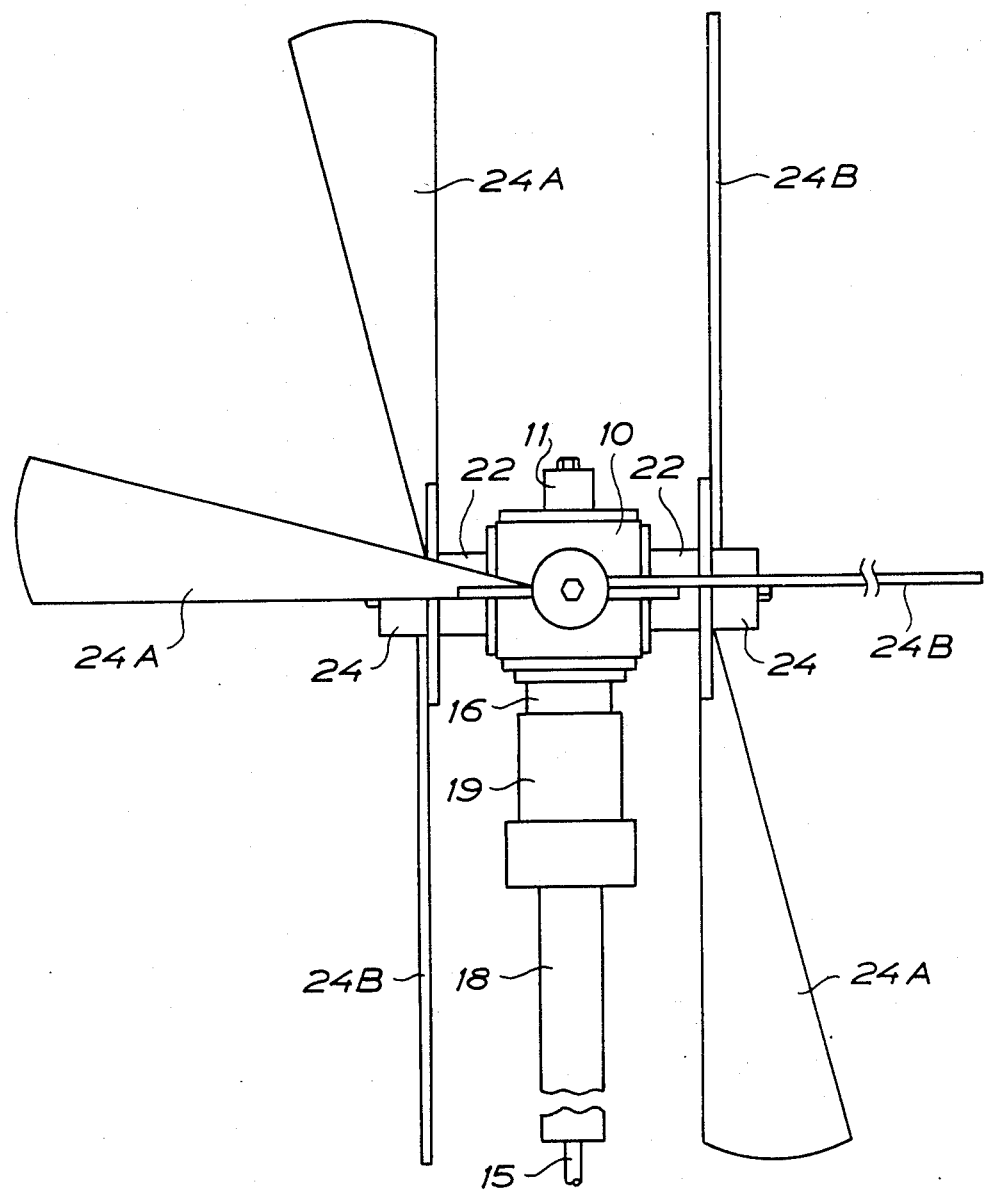
Figure 2:
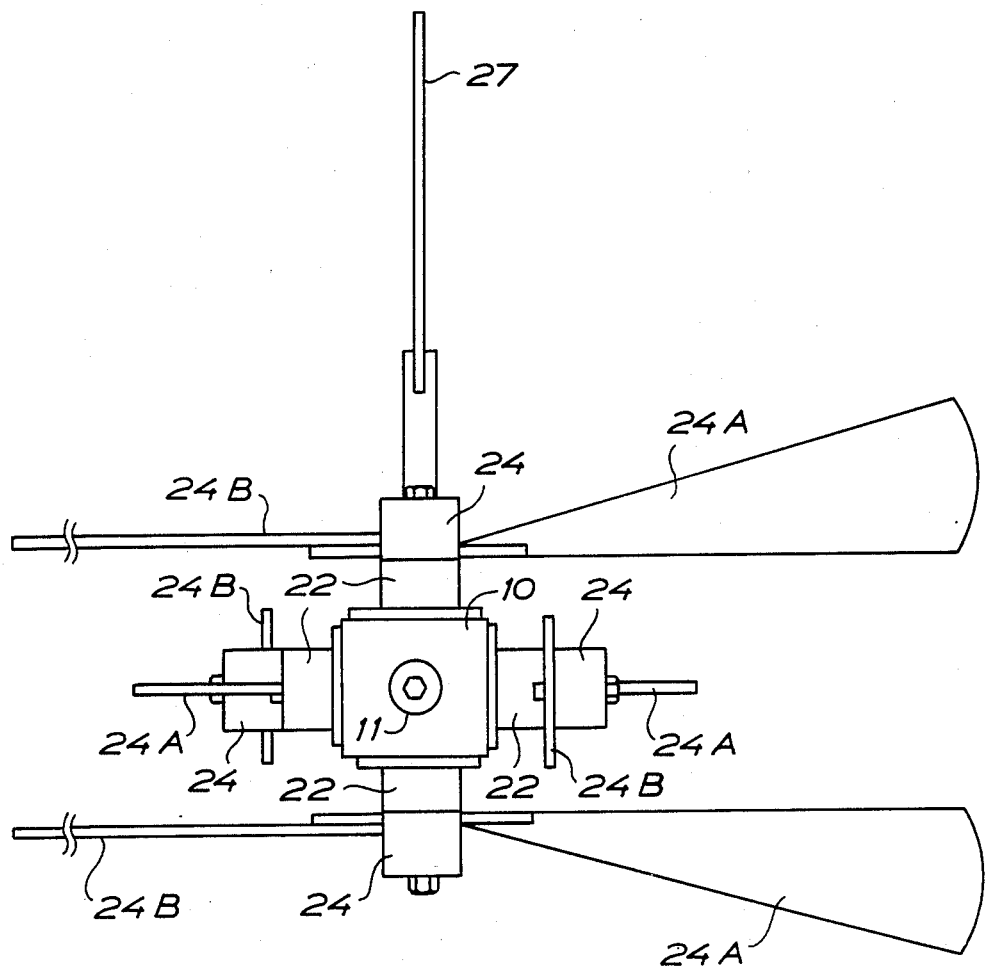
FIG. 2 is a plan view of the wind turbine in FIG. 1.

The wind turbine includes in the manner described in the U.S. patent application referred to above a gear housing 10, the top wall of which forms an external centrally arranged upwardly projecting cylindrical socket 11, and in this socket the housing is non-rotatably connected by means of a wedge 12 and screw connections 13 to a stub 14 on a shaft 15. This shaft extends through the gear housing 10, and further through a cylindrical bearing housing 16, wherein the shaft is rotatably mounted by means of an antifriction bearing 17. The shaft passes coaxially through the bearing housing 16 and then extends down through a mast 18 of optional length, by means of which the wind turbine is placed at a suitable height above the ground. The shaft 15 can be journaled by means of antifriction bearings at one or several places inside the mast. While the shaft 15 thus is rotatably mounted in the bearing housing 16, this in turn is rotatably mounted on the mast by being connected with a socket 19 which is rotatably supported at the upper end of the mast by means of antifriction bearings 20.

The gear housing 10 is rotatably mounted outside the bearing housing 16 by means of antifriction bearings 21 and forms at opposite side walls projecting bearing sockets 22 for two pairs of coaxially arranged shafts 23 which are rotatably mounted in the respective sockets 22 by means of suitable antifriction bearings. Rotors equipped with wings 24 of the type which is described in the Swedish patent application No. 7900818-1 are fixedly connected with the shafts 23 at the ends thereof which project from the sockets 22. Each rotor includes two wings 24A and 24B principally in the form of circular sectors, one of which, 24A, has its plane in the axial plane of the associated shaft and the other, 24B, is mounted transversely of the last-mentioned plane. Inside the gear housing 10, each shaft 23 is equipped with a conical gear wheel 25 or 25' fixedly mounted to the shaft. The two gear wheels 25 of one pair of coaxial shafts engage a gear ring 26 arranged on the bearing unit 16, and thus form an angular gear together with the gear ring. This angular gear has the gear ratio 1:1. Also, said one pair of rotors engage the two gear wheels 25' on the other pair of coaxially arranged shafts 23, but said last mentioned gear wheels do not engage the gear ring 26. The gear ratio of the gear wheels 25 and 25' is also 1:1, and thus the rotors are interconnected for position-synchronized rotation. As can be seen from the drawings, adjacent rotors are angularly shifted in relation to one another 90° in one and the same direction for one turn about the vertical shaft 15. The gear wheels 25 thus have larger axial length than the gear wheels 25' for engagement with both the gear ring 26 and the gear wheels 25', while on the contrary the gear wheels 25' are not long enough to engage the gear ring. However, each gear wheel 25 can be replaced by two gear wheels on the same shaft, one of which engages the gear ring 26 and the other engages the gear wheels 25'. In that case the two gear wheels may have different numbers of gear teeth, but the gear ratio between the rotors and between one of the rotor pairs and the gear ring should be 1:1. All rotors are thus directly or indirectly coupled to the gear ring 26 in order to form a positively controlled system which operates in accordance with the principles described in the Swedish patent application No. 7900818-1.

The gear housing is completely closed, but one or more of the side-walls thereof may consist of or be designed as removable covers in order to make it possible to reach the interior of the gear housing whenever necessary. The gear housing to a certain level should be filled with lubricating oil, in order to make the angular gear work in the oil under continuous lubrication of same. Through this, the angular gear is practically free from maintenance, as change of lubricating oil has to take place at long intervals only and the gear is well protected against dirt and corrosion since it is completely enclosed in the gear housing 10.

The wing-equipped rotors 24 of each pair are rotating in opposite directions, when exposed to the air, and are interconnected by means of the gear wheels 25 and 25' to be position-synchronized. Then the gear wheels 25 are rotating in engagement with the gear ring 26, which is to be considered as a stationary part, which means that the gear wheels 25 driven by the four of the rotors because the gear wheels 25 engage the gear wheels 25', will travel around the gear ring 26 and thus rotate the gear housing 10 rotatably carried on the bearing housing 16. The shaft 15 which is non-rotatably connected to the bearing housing thus will be rotated by the four rotors in order to drive some machine which is coupled to the shaft in its lower end. As the gear drive has the gear ratio 1:1, each rotor 24 will make one revolution for each revolution of the bearing housing 16.

The rotors can be said to have a starting position, i.e., the one shown in FIG. 1, in which the wings of one pair are positioned vertically rotated 180° in relation to each other, and the wings of the other pair are in identical horizontal positions. In the starting position, which will be taken twice per revolution of the shaft 15, the wind direction should be substantially perpendicular to the rotational axis of said one pair of wings which are substantially vertical for obtaining the maximum angle of incidence. In places where the prevailing winds always come from one and the same direction, the socket 19 may be fixedly attached to the mast 18 in an angular position which correspond to said starting position. When the socket 19, as shown here, is rotatably mounted on the mast 18, it should be equipped with a vane 27, connected to the bearing housing 16 or the socket 19, in order that the wind turbine shall be turned to the angular position, which corresponds to said starting position. However, the object of the vane is also to stabilize the socket 19 in order that the socket, when the wind turbine is operating, shall be kept in a stationary rotated position, so that the gear ring 26 then is to be considered a stationary part of the wind turbine.

Figure 3:
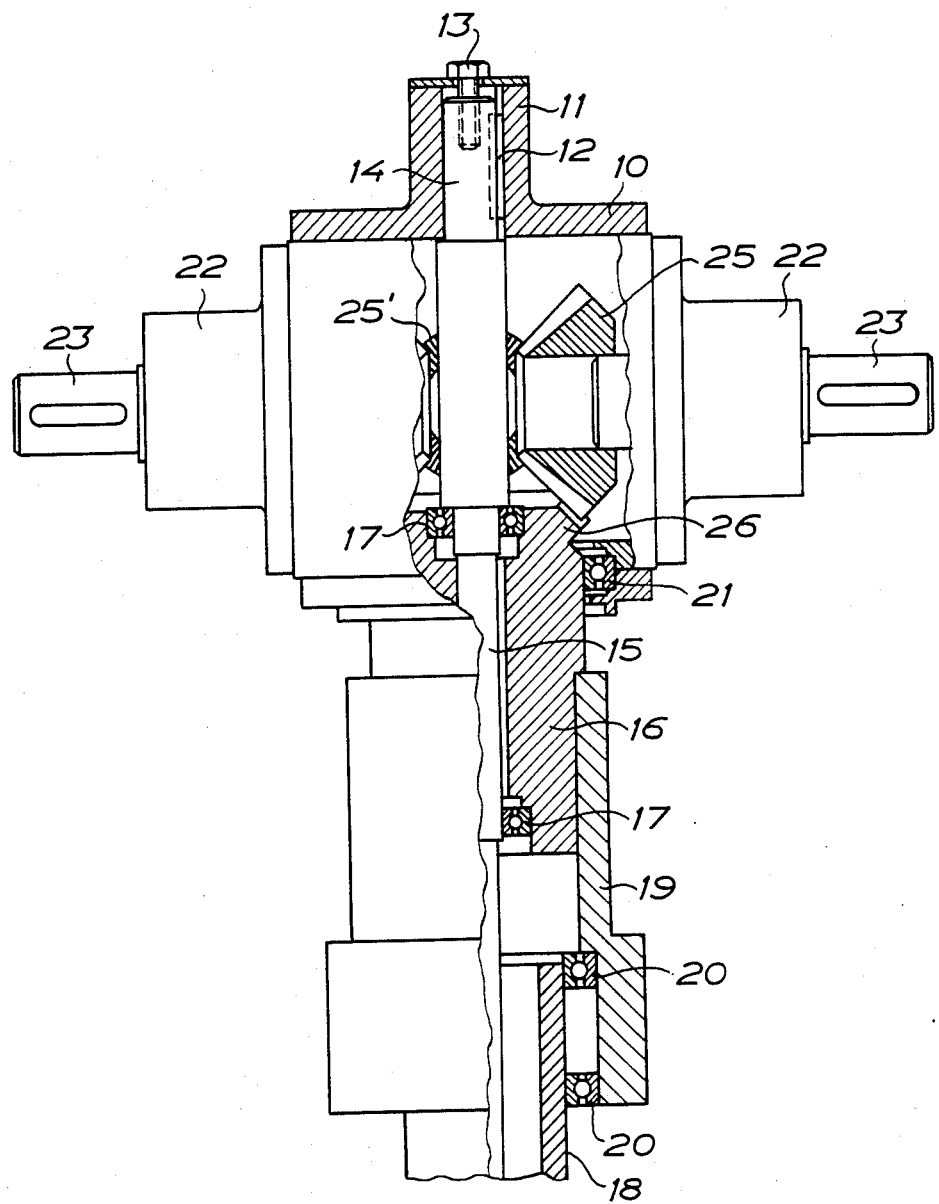
FIG. 3 is an enlarged side view, partly an axial cross sectional view of the gear drive of the wind turbine.
Figure 4:
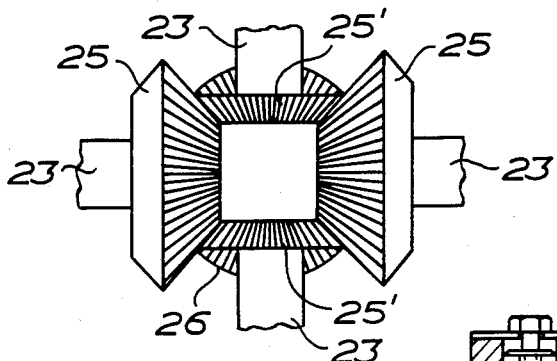
FIG. 4 is a diagrammatic plan view of the gear drive proper in the gear housing.
Figure 5:
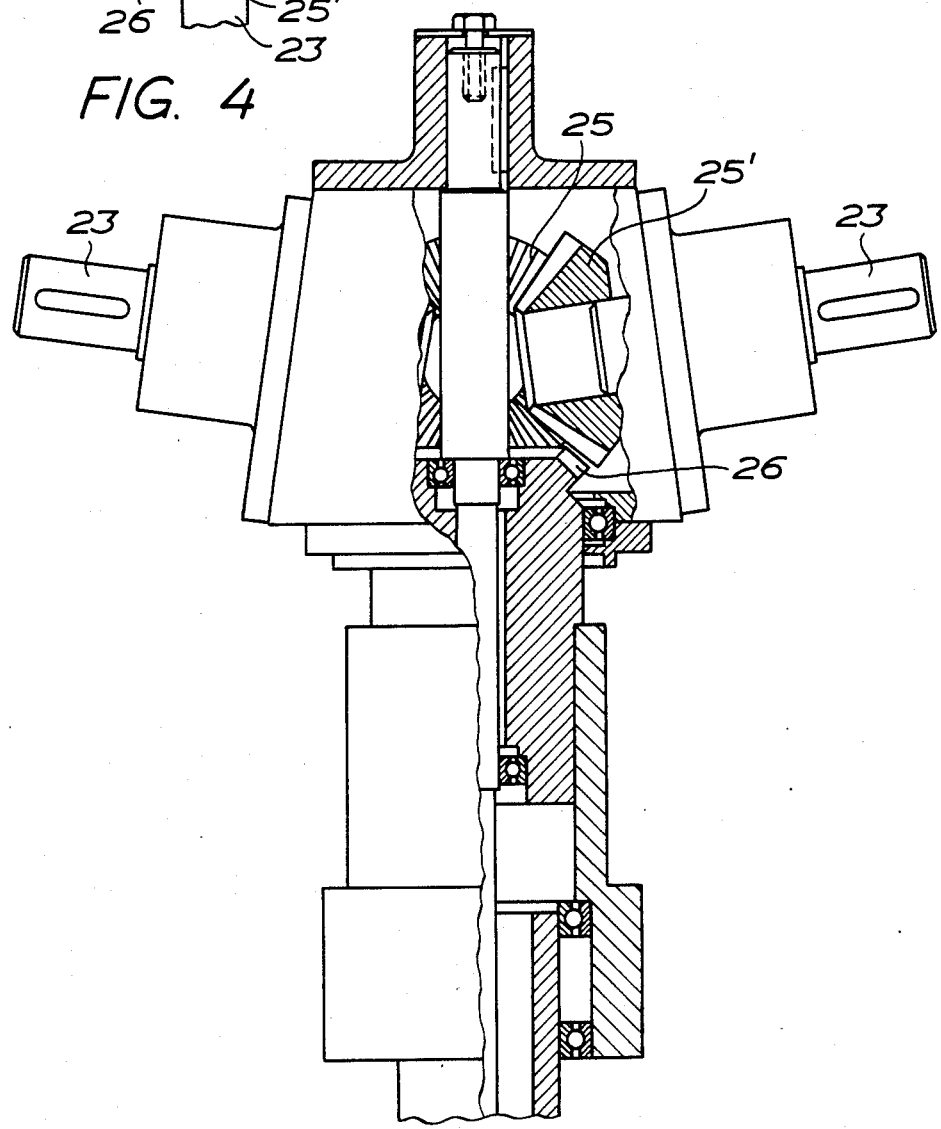
FIG. 5 is a view similar to that of FIG. 3 of a modified embodiment of the wind turbine as seen perpendicularly to the view of FIG. 3.

In the modification of FIG. 5 (it should be noted that this view is perpendicular to that of FIG. 3) the gear wheels 25 and 25' are identical and are constructed as the gear wheels 25 previously described, that is they have a larger axial length. They engage each other in the manner previously described. The shafts 23 of the gear wheels 25 are arranged horizontally and engage the gear ring 26 in the manner shown in FIG. 3, while the shafts 23 are arranged in an angle of about 10° to the horizontal plane such that the gear wheels 25' are lifted to be disengaged from the gear ring 26, as will be seen from FIG. 5. The form and design of the gear teeth should of course be adapted to the angular position of the gear wheels 25' but no problems would be involved therein. The angular position of the gear wheels 25' does not affect the operation of the wind turbine.

I claim:

1. A wind turbine, comprising a first pair of rotors equipped with wings, rotor shafts mounting said first pair of rotors, said shafts each having a longitudinal axis with one wing lying in a plane extending substantially parallel to a plane passing through said longitudinal axis and with the other wing lying in a plane extending substantially perpendicular to said longitudinal axis, a second pair of rotors, equipped with wings, rotor shafts mounting said second pair of rotors, said rotor shafts having each a longitudinal axis with one wing lying in a plane extending substantially parallel to a plane extending through said longitudinal axis and with the other wing lying in a plane extending substantially perpendicular to said longitudinal axis of said rotor shaft, one of said first pair of rotors being displaced 180° in relation to the other rotor of said first pair of rotors and one of said second pair of rotors being displaced 180° in relation to the other rotor of said second pair of rotors, the rotors of said one pair being displaced 90° in relation to the rotors of said second pair, gear wheels being provided on said rotor shafts, an oil-proof gearing housing rotatably mounting said rotor shafts, the gear wheels on the other shafts of said first pair of rotors engaging the gear wheels on the rotor shafts of said second pair of rotors to form therewith a gear train providing a ratio of 1:1 between said first and second pairs of rotors and interconnecting said shafts for position-synchronized rotation of the rotors, a vertical output shaft fixedly connected at its upper end to the top of said gearing housing and extending through the interior thereof, said rotor shafts extending generally transverse to said output shaft on diametrically opposite sides of the output shaft, a stationary element pivotally supporting said gearing housing at the bottom thereof for rotation about the axis of said output shaft, and a gear ring on said element, enclosed by the gearing housing and positioned coaxially relative to said output shaft, the gear wheels on the rotor shafts of said second pair of rotors engaging said gear ring.

2. A wind turbine as claimed in claim 1 wherein the rotor shafts of said first and second pairs of rotors are arranged substantially horizontally.

3. A wind turbine as claimed in claim 1 wherein the gear wheels are identical and wherein the rotor shafts of said first pair of rotors are arranged substantially horizontally with the gear wheels thereof engaging the gear ring, and wherein the shafts of said second pair of rotors are angled upwards from the horizontal position with the gear wheels thereof disengaged from the gear ring.

4. A wind turbine as claimed in claim 3 wherein the rotor shafts of said second pair of rotors are arranged at an angle of about 10° to the horizontal.

* * * * *